United States Patent
Samouce

(10) Patent No.: US 10,493,924 B2
(45) Date of Patent: Dec. 3, 2019

(54) TIRE MOUNTED ATTACHMENT APPARATUS

(71) Applicant: Jerome A. Samouce, Clayton, NC (US)

(72) Inventor: Jerome A. Samouce, Clayton, NC (US)

(*) Notice: Subject to any disclaimer, the term of this patent is extended or adjusted under 35 U.S.C. 154(b) by 0 days.

(21) Appl. No.: 16/017,723

(22) Filed: Jun. 25, 2018

(65) Prior Publication Data

US 2018/0370452 A1 Dec. 27, 2018

Related U.S. Application Data

(60) Provisional application No. 62/525,150, filed on Jun. 26, 2017.

(51) Int. Cl.
*B60R 9/06* (2006.01)
*B62D 43/02* (2006.01)
*F16M 13/02* (2006.01)

(52) U.S. Cl.
CPC ............... *B60R 9/06* (2013.01); *B62D 43/02* (2013.01); *F16M 13/02* (2013.01)

(58) Field of Classification Search
CPC .................. G09F 2017/0075; B62D 43/02
USPC ............................................. 224/42.13, 42.14
See application file for complete search history.

(56) References Cited

U.S. PATENT DOCUMENTS

| | | | | |
|---|---|---|---|---|
| 2,888,178 A | * | 5/1959 | Olson | B60R 9/058 224/324 |
| 3,240,455 A | * | 3/1966 | Swezy | G09F 17/00 116/28 R |
| 3,349,977 A | * | 10/1967 | Caminiti | B60R 9/06 224/314 |
| 5,215,232 A | * | 6/1993 | Wyers | B60R 9/06 224/42.13 |
| 5,558,261 A | * | 9/1996 | Hedeen | B60R 9/10 224/42.13 |
| D632,231 S | * | 2/2011 | Mattucci | D12/162 |
| D712,315 S | * | 9/2014 | Wagner | D12/162 |
| 9,102,280 B1 | * | 8/2015 | Crawford | B60R 9/10 |
| 2016/0284253 A1 | * | 9/2016 | Williams, Jr. | G09F 17/00 |

* cited by examiner

*Primary Examiner* — Scott T McNurlen
(74) *Attorney, Agent, or Firm* — Albert J. Minn; Grell & Watson Patent Attorneys LLC

(57) ABSTRACT

An adjustable attachment apparatus and an associated method for attaching an accessory to a tire is provided. The apparatus may include a first and second attachment arm that each include a first portion and a second portion. The apparatus may include a third attachment arm that includes a first portion and a second portion, and the first, second, and third attachment arm may be radially spaced apart from one another. The apparatus may include at least one securing assembly configured to securely engage the first attachment arm, the second attachment arm, and the third attachment arm to the tire. The apparatus may further include an accessory receptacle member disposed proximate to the first portion of the third attachment arm. The accessory receptacle member may define at least one channel aligned parallel to the first portion of the third attachment arm, the channel being configured to receive an accessory attachment therein.

13 Claims, 10 Drawing Sheets

TIRE MOUNTED ATTACHMENT APPARATUS

CROSS-REFERENCE TO RELATED APPLICATION(S)

To the full extent permitted by law, the present United States Non-provisional patent application hereby claims priority to and the full benefit of U.S. Provisional Application No. 62/525,150, filed Jun. 26, 2017, entitled "Spare Tire Mounted Grapple Assembly Freedom Flyer", the disclosure of which is each incorporated herein by reference in its entirety.

BACKGROUND

Field of the Disclosure

The present disclosure relates generally to an accessory attachment device, and more specifically, to an accessory attachment device configured to mount to a spare tire disposed on a vehicle. The accessory attachment device may provide for securely using an accessory with the vehicle while the vehicle may be stationary or in motion.

Description of Related Art

Spare tires have been known to be mounted to vehicles on a rear surface of a vehicle, such as, for example, a rear door of a vehicle. Additionally, spare tires have varied in size due to differing vehicle specifications and/or user modifications. Users of such vehicles have desired to mount accessories, such as flag poles, to the spare tire assembly of their vehicles to demonstrate their individualities, patriotism, and other uniqueness. Other typical accessory attachment devices have been hindered by obstructing the operation of the rear door. Another accessory attachment device may have been problematic by utilizing a trailer hitch of the vehicle, thereby precluding the towing functionality of the vehicle and use of the accessory simultaneously.

Therefore, it is readily apparent that there is a recognized unmet need for a tire mounted attachment apparatus for an accessory, wherein at least one advantage of such an apparatus may include using an accessory attachment device for a spare tire assembly while still providing for utilization of the trailer hitch assembly of the vehicle.

BRIEF SUMMARY

Example implementations of the present disclosure are directed an adjustable attachment apparatus for attaching an accessory to a tire. The attachment apparatus may include a first attachment arm that includes a first portion and a second portion. Further, the attachment apparatus may include a second attachment arm that includes a first portion and a second portion. Additionally, the attachment apparatus may include a third attachment arm that includes a first portion and a second portion. The first attachment arm, the second attachment arm, and the third attachment arm may be radially spaced apart from one another. The apparatus may further include at least one securing assembly configured to securely engage the first attachment arm, the second attachment arm, and the third attachment arm to the tire. Additionally or alternatively, the apparatus may include an accessory receptacle member disposed proximate to the first portion of the third attachment arm. The accessory receptacle member may define at least one channel aligned parallel to the first portion of the third attachment arm, and the channel may be configured to receive an accessory attachment therein.

In some aspects, the adjustable attachment apparatus may a channel defined by the accessory receptacle member that may be configured to reciprocally engage an accessory attachment. The accessory attachment may further include a flag pole. In another aspect, the first portion and the second portion of the third attachment arm may be configured to reciprocally engage one another. In yet another aspect, the second portion of the third attachment arm may be configured to extend from the first portion of the third attachment arm along a line parallel to the first portion of the third attachment arm.

According to some aspects of the present disclosure, the second portion of the first attachment arm extends orthogonally from the first portion of the first attachment arm, and the second portion of the second attachment arm extends orthogonally from the first portion of the second attachment arm. In yet another aspect, the adjustable attachment apparatus may include a securing plate disposed proximate a first end of the first attachment arm, a first end of the second attachment arm, and a first end of the third attachment arm. The securing plate may further define an accessory securing plate aperture configured to receive at least one accessory securing element therethrough.

In some aspects, the adjustable attachment apparatus may include an accessory receptacle member that defines at least one accessory receptacle member aperture. The centers of the at least one accessory receptacle member aperture, and the center of the accessory securing plate aperture may be aligned with respect to one another when the adjustable attachment apparatus is disposed in a secured configuration. According to some aspects, the accessory receptacle member may define a plurality of channels, and each of the plurality of channels may be configured to receive an accessory attachment therein.

In yet another aspect, the second portion of the first attachment arm and the second portion of the second attachment arm may be configured to operably engage a circumferential surface of the tire, such as, for example, the tread surface of the spare tire. According to some aspects, the adjustable attachment apparatus may further include at least one securing assembly that further includes a first ratchet assembly disposed proximate the second end of the first attachment arm. The adjustable attachment apparatus may include at least one securing assembly that includes a second ratchet assembly disposed proximate the second end of the second attachment arm. In some aspects, the apparatus may include a strap securing loop disposed proximate the second end of the third attachment arm, and a strap configured to operably engage each of the first ratchet assembly, the second ratchet assembly, and the strap securing loop to secure the adjustable attachment apparatus to the tire.

According to another aspect, the first attachment arm may define a pair of ratchet assembly apertures disposed proximate the second end of the first attachment arm. The pair of ratchet assembly apertures may be disposed on opposing surfaces of the first attachment arm. Additionally or alternatively, the second attachment arm may define a pair of ratchet assembly apertures disposed proximate the second end of the second attachment arm. In particular, the pair of ratchet assembly apertures may be disposed on opposing surfaces of the second attachment arm. The first and second attachment arm may each define a ratchet assembly recess defined by a surface orthogonal to the opposing surfaces that define the ratchet assembly apertures. In some aspects, the ratchet assembly recess may be configured to provide for operation of the respective ratchet assemblies disposed proximate the second end of the first attachment arm and the second end of the second attachment arm.

In yet another aspect of the present disclosure, a method of attaching an adjustable attachment apparatus for attaching an accessory to a tire may be provided. The method may include positioning a first attachment arm and a second attachment arm of an adjustable attachment apparatus on an upper circumferential surface of a tire. The apparatus may include a first attachment arm including a first portion and a second portion, a second attachment arm including a first portion and a second portion, a third attachment arm including a first portion and a second portion, wherein the first attachment arm, the second attachment arm, and the third attachment arm are radially spaced apart from one another. The apparatus may further include at least one securing assembly configured to securely engage the first attachment arm, the second attachment arm, and the third attachment arm to the tire. Additionally, the apparatus may include an accessory receptacle member disposed proximate to the first portion of the third attachment arm, and the accessory receptacle member may define at least one channel aligned parallel to the first portion of the third attachment arm. Further, the channel may be configured to receive an accessory attachment therein. In some aspects, the method may include positioning the second portion of the third attachment arm to a bottom circumferential surface of the tire. Additionally, the method may include securing the adjustable attachment apparatus to the tire with the at least one securing assembly. According to some aspects, the method may also include inserting the accessory attachment into the channel defined by the accessory receptacle member.

The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
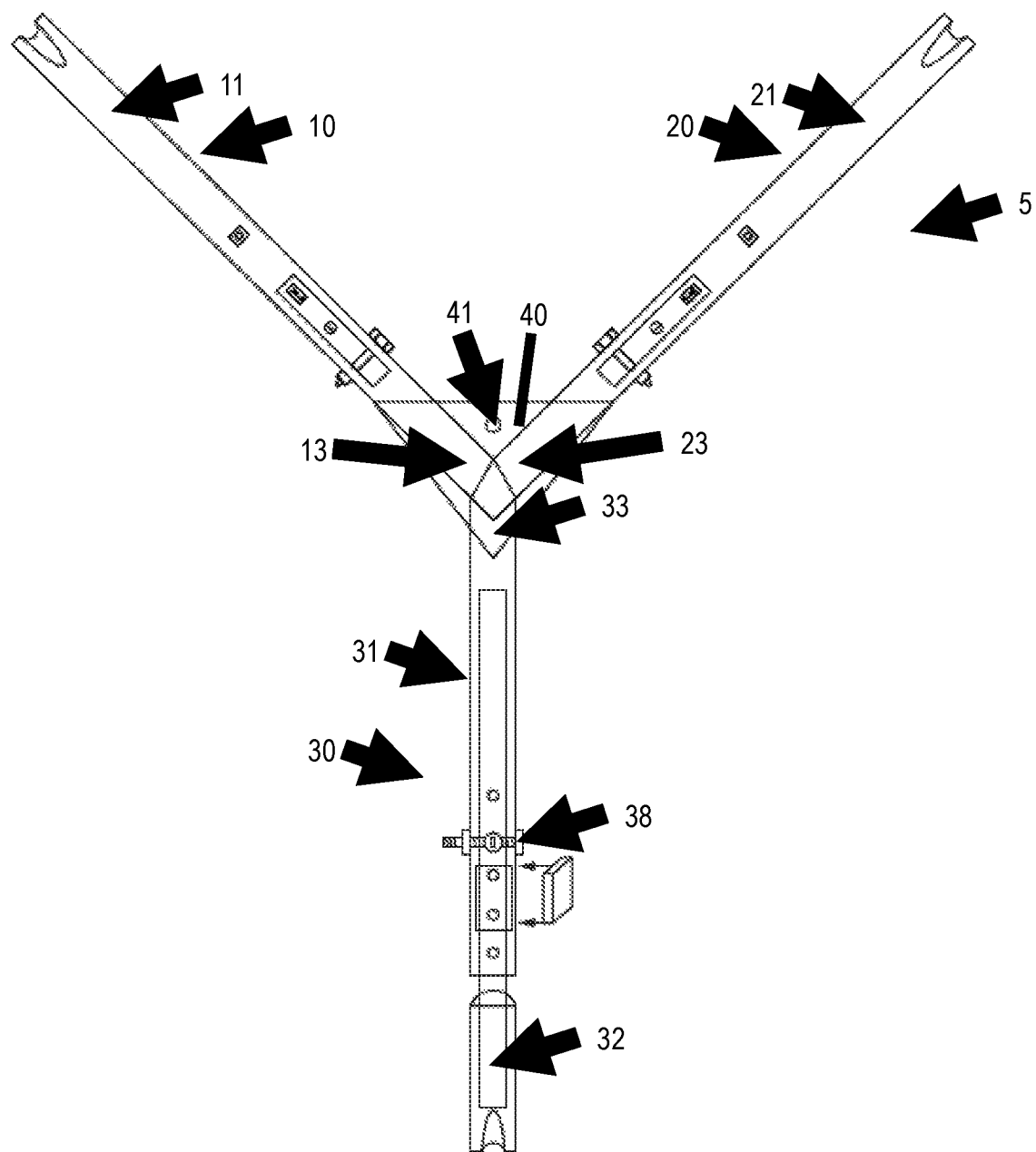
FIG. 1 illustrates a front view of an adjustable attachment apparatus with various parts removed for clarity according to one example implementation of the present disclosure.

Some implementations of the present disclosure will now be described more fully hereinafter with reference to the accompanying drawings, in which some, but not all implementations of the disclosure are shown. Indeed, various implementations of the disclosure may be expressed in many different forms and should not be construed as limited to the implementations set forth herein; rather, these exemplary implementations are provided so that this disclosure will be thorough and complete, and will fully convey the scope of the disclosure to those skilled in the art. As used herein, the term "and/or" and the "/" symbol includes any and all combinations of one or more of the associated listed items. Further, unless otherwise indicated, something being described as being a first, second or the like should not be construed to imply a particular order. It should be understood that the terms first, second, etc. may be used herein to describe various steps, calculations, positions and/or the like, these steps, calculations or positions should not be limited to these terms. These terms are only used to distinguish one operation, calculation, or position from another. For example, a first position may be termed a second position, and, similarly, a second step may be termed a first step, without departing from the scope of this disclosure. Additionally, something may be described as being above something else (unless otherwise indicated) may instead be below, and vice versa; and similarly, something described as being to the left of something else may instead be to the right, and vice versa. As used in the specification, and in the appended claims, the singular forms "a", "an", "the", include plural referents unless the context clearly dictates otherwise. Like reference numerals refer to like elements throughout.

Figure 4:
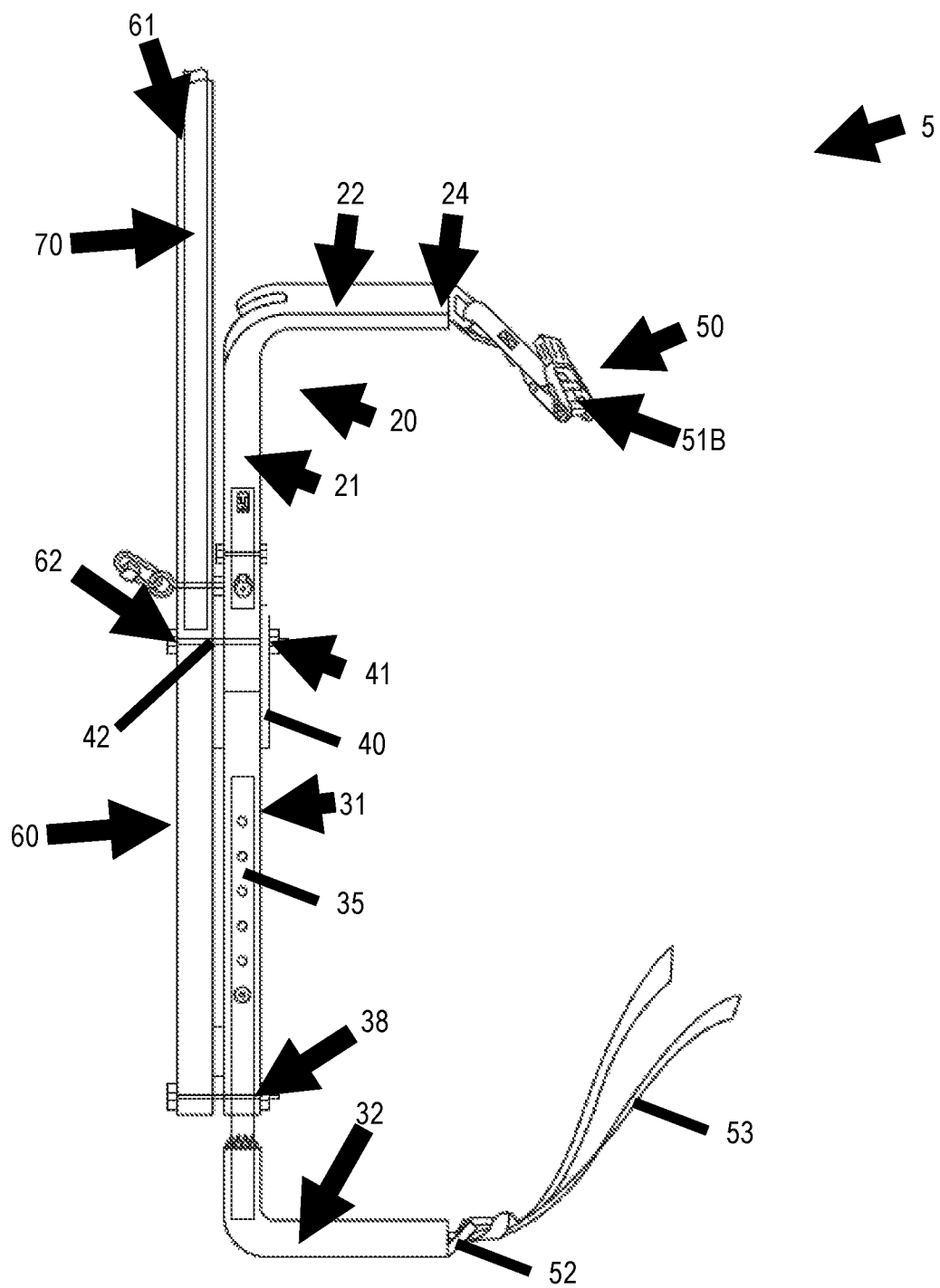
FIG. 4 illustrates a side view of an adjustable attachment apparatus according to one example implementation of the present disclosure.

Implementations of the present disclosure provide for an adjustable attachment apparatus for attaching an accessory, such as, for example, a flag pole, to a tire. As shown in FIGS. 1 and 4, an adjustable attachment apparatus 5 for attaching an accessory, such as, for example, a flag pole, to a tire, may include a first attachment arm 10, a second attachment arm 20, and a third attachment arm 30. According to some aspects, the adjustable attachment apparatus 5 may include any number of attachment arms. In some aspects, the first attachment arm 10, the second attachment arm 20, and the third attachment arm 30 may be radially spaced apart from one another. For example, as shown in FIG. 1, the first attachment arm 10 and the second attachment arm 20 may each form an angle of approximately 45 degrees from a vertical axis, while the third attachment arm 30 may be aligned parallel with the vertical axis.

In some aspects, the adjustable attachment apparatus 5 may include a first attachment arm 10 and a second attachment arm 20 configured to operably engage a circumferential surface of a spare tire stored on a vehicle, such as, for example, a spare tire mounted on a rear door. For example, a first attachment arm 10 may include a first portion 11 and a second portion 12. Additionally or alternatively, a second attachment arm 20 may include a first portion 21 and a second portion 22. In particular, the second portion 12 of the first attachment arm 10 may extend approximately orthogonally from the first portion 11 of the first attachment arm 10. Further, the second portion 22 of the second attachment arm 20 may extend approximately orthogonally from the first portion 21 of the second attachment arm 20. In some aspects, the second portion 12 of the first attachment arm 10 and the second portion 22 of the second attachment arm 20 may be configured to operably engage the circumferential surface of the tire, such as, for example, the treaded surface of the tire. In some aspects, the second portions 12, 22 of the first and second attachment arms 10, 20 may each include a textured material configured to operably engage the circumferential surface of the tire, such as, for example, with increased friction.

Figure 2:
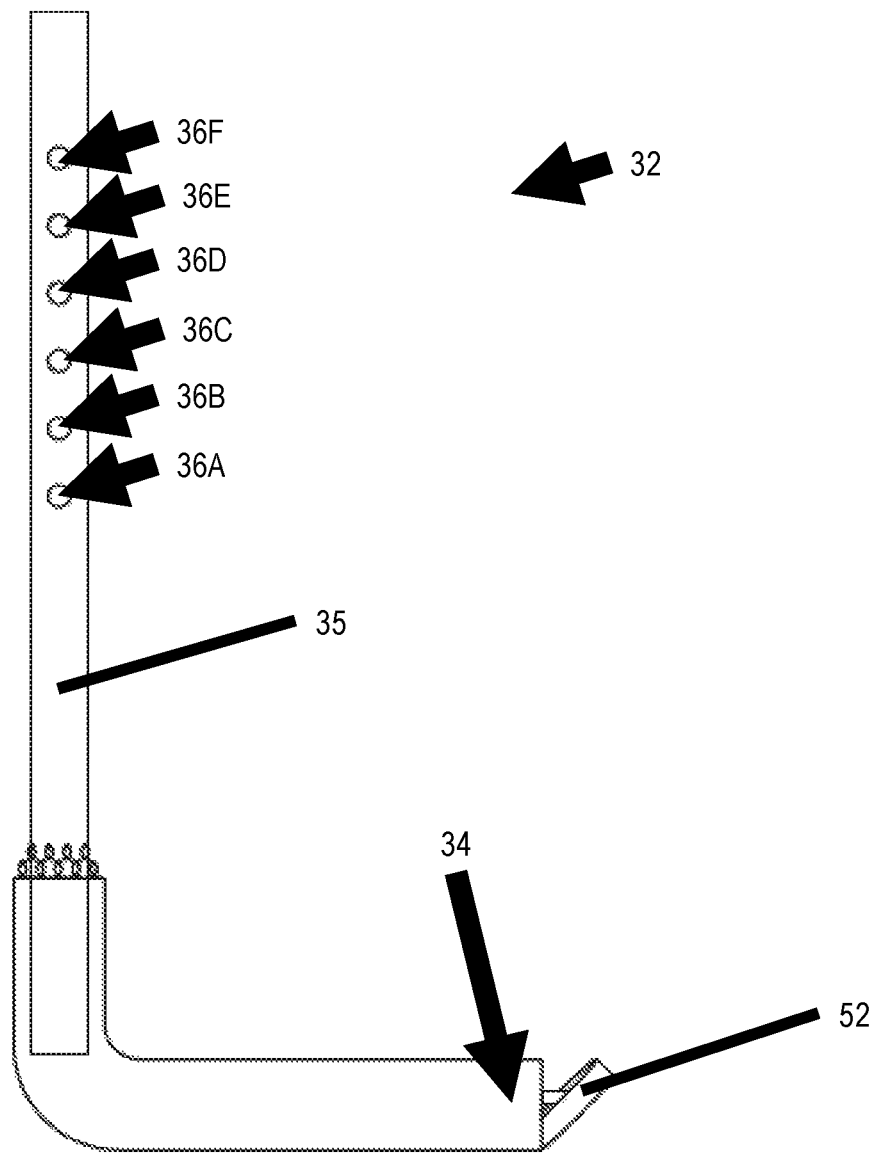
FIG. 2 illustrates a side view of a second portion of a third attachment arm according to one example implementation of the present disclosure.

As shown in FIGS. 2 and 4, a third attachment arm 30 may include a first portion 31 and a second portion 32. In particular, as shown in FIG. 2, the second portion 32 of the third attachment arm 30 may be include an inner sleeve portion 35 configured to operably engage the first portion 31 of the third attachment arm 30. For example, the first portion 31 may define a channel that extends longitudinally along the first portion 3, and the channel may be configured to receive the inner sleeve portion 35 therein. Additionally or alternatively, the channel may be configured to reciprocally engage the inner sleeve portion 35 in a friction fit. Further, the inner sleeve portion 35 may define a plurality of apertures 36A, 36B, 36C, 36D, 36E, 36F, on opposing surfaces of the inner sleeve portion 35 configured to provide for adjustability of the third attachment arm 30. Additionally, the first portion 31 of the third attachment arm 30 may define at least one aperture 38 configured to receive a fastener element therethrough so as to secure the second portion 32 of the third attachment arm 30 to the first portion 31. For example, the inner sleeve portion 35 may be positioned at a desired height where at least one of the apertures 36A, 36B, 36C, 36D, 36E, 36F of the inner sleeve portion 35 is aligned with the aperture 38 of the first portion 31 and so as to allow a fastener element to secure the second portion 32 to the first portion 31 of the third attachment arm 30, thereby allowing the third attachment arm 30 to adjustably attach the attachment apparatus 5 to the particular size of the tire. In some aspects, the second portion 32 of the third attachment arm 30 may extend from the first portion 31 of the third attachment arm 30 along a line parallel to the first portion 31 of the third attachment arm 30.

Figure 7:
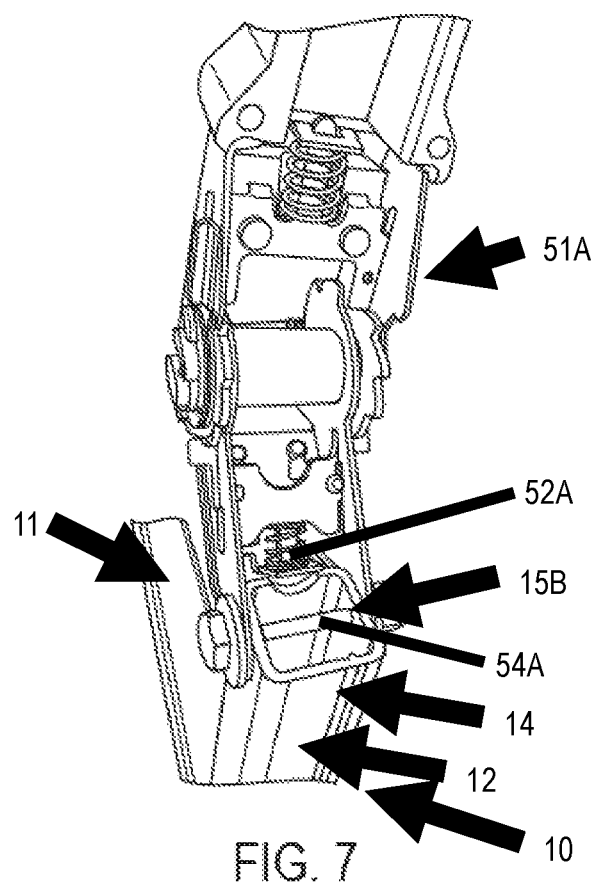
FIG. 7 illustrates a perspective view of a second end of a first attachment arm and a portion of a securing assembly according to one example implementation of the present disclosure.
Figure 8:
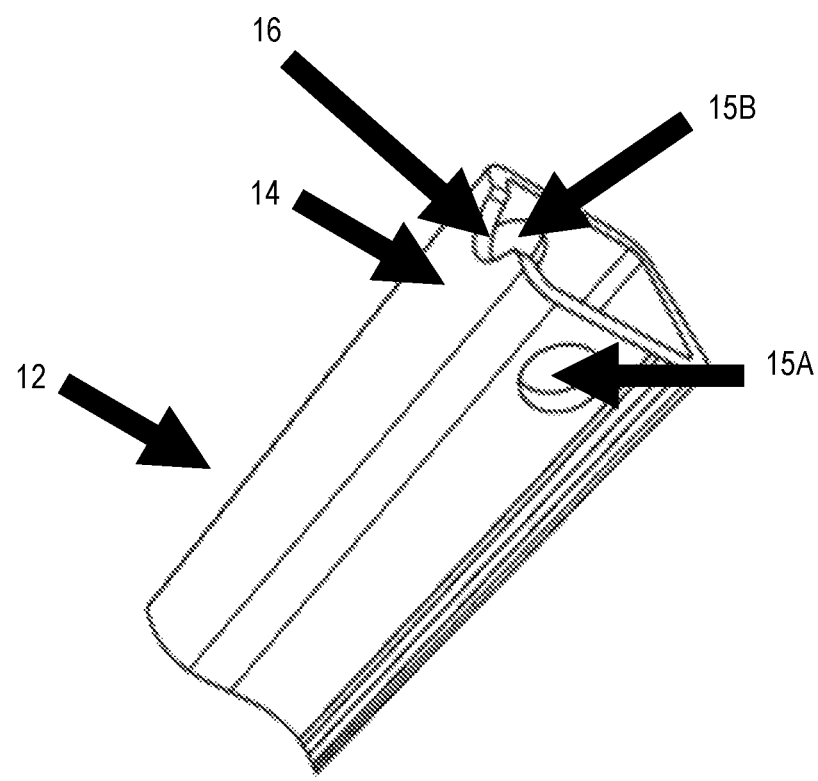
FIG. 8 illustrates a perspective view of a second end of a first attachment arm according to one example implementation of the present disclosure.

Additionally or alternatively, the adjustable attachment apparatus 5 may further include at least one securing assembly 50 configured to securely engage the first attachment arm 10, the second attachment arm 20, and the third attachment arm 30 to the tire. In particular, the at least one securing assembly 50 may include at least one ratchet buckle assembly 51A, 51B disposed proximate the second end 14 of the first attachment arm 10 and the second end 24 of the second attachment arm 20 respectively. As shown in FIG. 7, the at least one ratchet buckle 51A may be operably engaged with the second end 14 of the first attachment arm 10. In particular, the second end 14 of the first attachment arm 10 may define a pair of ratchet buckle securing apertures 15A, 15B that are disposed on opposing surfaces of the first attachment arm 10. In some aspects, the at least one ratchet buckle 51A may be securely engaged with the second end 14 of the first attachment arm by a ratchet buckle securing element 54A that is configured to engage the ratchet buckle assembly 51A and each of the ratchet buckle securing apertures 15A, 15B. Additionally or alternatively, a ratchet buckle 51B may be securing engaged with the second end 24 of the second attachment arm by a ratchet buckle securing element 54B that is configured to engage the ratchet buckle 51B and each of the ratchet buckle securing apertures 25A, 25B defined by opposing surfaces of the second portion 22 of the second attachment arm 20.

In some aspects, the second ends 14, 24 of the first and second attachment arms 10, 20 may further define a ratchet buckle operating recess 16, 26 respectively. According to one aspect of the present disclosure, the ratchet buckle operating recesses 16, 26 may be configured to receive a ratchet buckle release member 52A, 52B of the first and second ratchet buckle 51A, 51B respectively so as to loosen a securing strap 53 operably engaged with the first and second ratchet buckles 51A, 51B.

Additionally or alternatively, the at least one securing assembly 50 may further include a strap securing loop 52 disposed proximate the second end 34 of the third attachment arm 30. In some aspects, the at least one securing assembly 50 may include a securing strap 53 configured to operably engage each of the at least one ratchet buckles 51A, 51B and the strap securing loop 52 so as to securely attach each of the first attachment arm 10, the second attachment arm 20, and the third attachment arm 30 to the tire. Although FIG. 4 illustrates the securing assembly 50 including a plurality of ratchet buckles and a ratchet strap to securely attach the first attachment arm, the second attachment arm, and the third attachment arm, other suitable securing mechanisms that are configured to secure the attachment apparatus 5 to an object, such as, for example a spare tire, are also encompassed within this disclosure.

Figure 3:
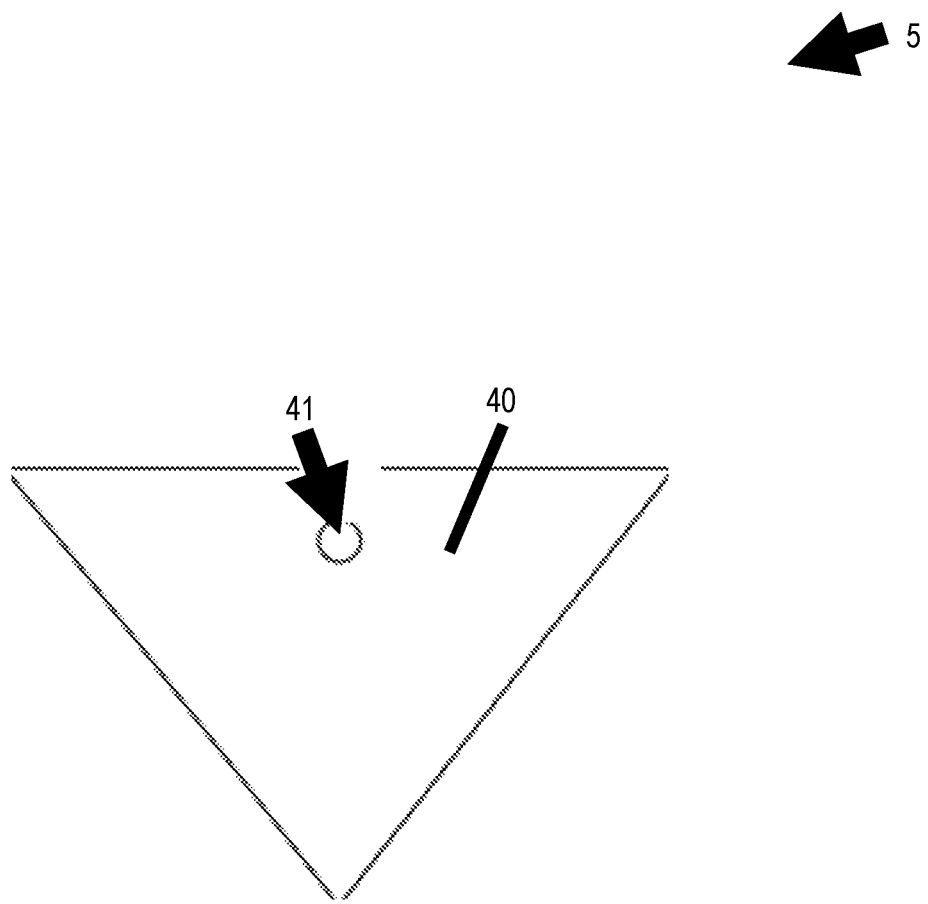
FIG. 3 illustrates a front view of a securing plate according to one example implementation of the present disclosure.

Referring to FIGS. 1 and 3, the adjustable attachment apparatus 5 may further include a securing plate 40 disposed proximate the first end 13 of the first attachment arm 10. Additionally or alternatively, the securing plate 40 may be disposed proximate the first end 23 of the second attachment arm 20. In some aspects, the securing plate 40 may be disposed proximate the first end 33 of the third attachment arm 30. According to one aspect, the securing plate 40 may be securely fastened with any one of the first attachment arm 10, the second attachment arm 20, and the third attachment arm 30. As shown in FIG. 4, the securing plate 40 may define an accessory securing plate aperture 41 configured to receive at least one accessory securing element 42 therethrough. In particular, the accessory securing plate aperture 41 may be configured to receive at least one accessory securing element 42 therethrough so as to securely fasten an accessory receptacle member 60 to the securing plate 40.

Figure 5:
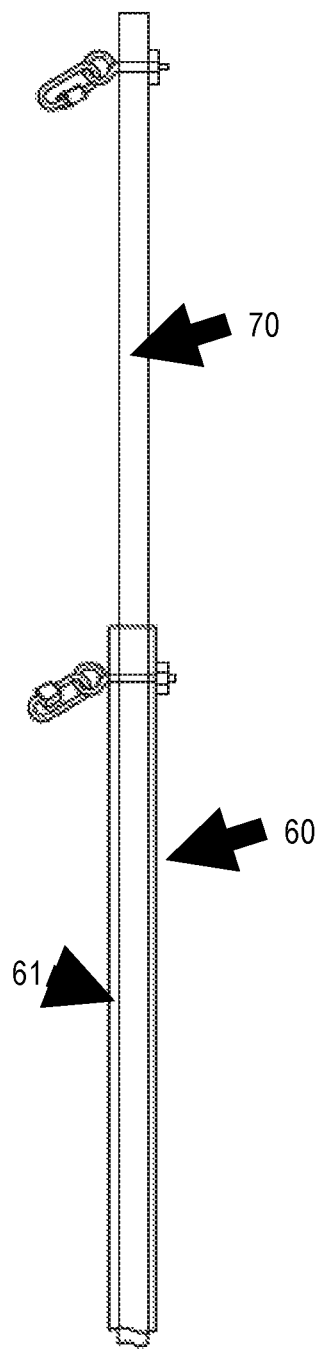
FIG. 5 illustrates a side view of an attachment accessory according to one example implementation of the present disclosure.

Referring to FIGS. 4 and 5, the adjustable attachment apparatus 5 may further include accessory receptacle member 60. As shown in FIG. 4, the accessory receptacle member 60 may be disposed proximate to the first portion 31 of the third attachment arm 30. For example, the accessory receptacle member 60 may be disposed proximate to the third attachment arm 30 and aligned parallel to the first portion 31 of the third attachment arm 30. In some aspects, the accessory receptacle member 60 may define a channel 61 extending longitudinally along the accessory receptacle member 60. Additionally or alternatively, the channel 61 may be aligned parallel to the first portion 31 of the third attachment arm 30. According to some aspects, the channel 61 may be configured to receive an accessory attachment 70 therein. For example, an accessory attachment 70, such as, for example, a flag pole, may be configured to be received within the channel 61 defined by the accessory receptacle member 60. In some aspects, the channel 61 defined by the accessory receptacle member 60 may be configured to reciprocally engage the accessory attachment 70 such as, for example, in a friction fit. According to some aspects, the accessory attachment 70 may include a tent pole, a lantern holder, a cooking device, such as, for example, a charcoal grill, a sink, a hunting cleaning stand, a trash collection device, an outdoor movie screen, a fishing pole, and/or the like.

According to one exemplary aspect, the accessory receptacle member 60 may define at least one accessory receptacle member aperture 62 disposed proximate to the securing plate 40. In some aspects, the accessory receptacle member aperture 62 may be disposed proximate the accessory securing plate aperture 41. For example, the center of the accessory receptacle member aperture 62 may be aligned with respect to the center of the accessory securing plate aperture 41 when the adjustable attachment apparatus 5 is disposed in a secured and/or operating configuration. Additionally or alternatively, the centers of the accessory receptacle member aperture 62 and the accessory securing plate aperture 41 may be aligned with respect to one another so as to receive the accessory securing element 42 therethrough.

Figure 6:
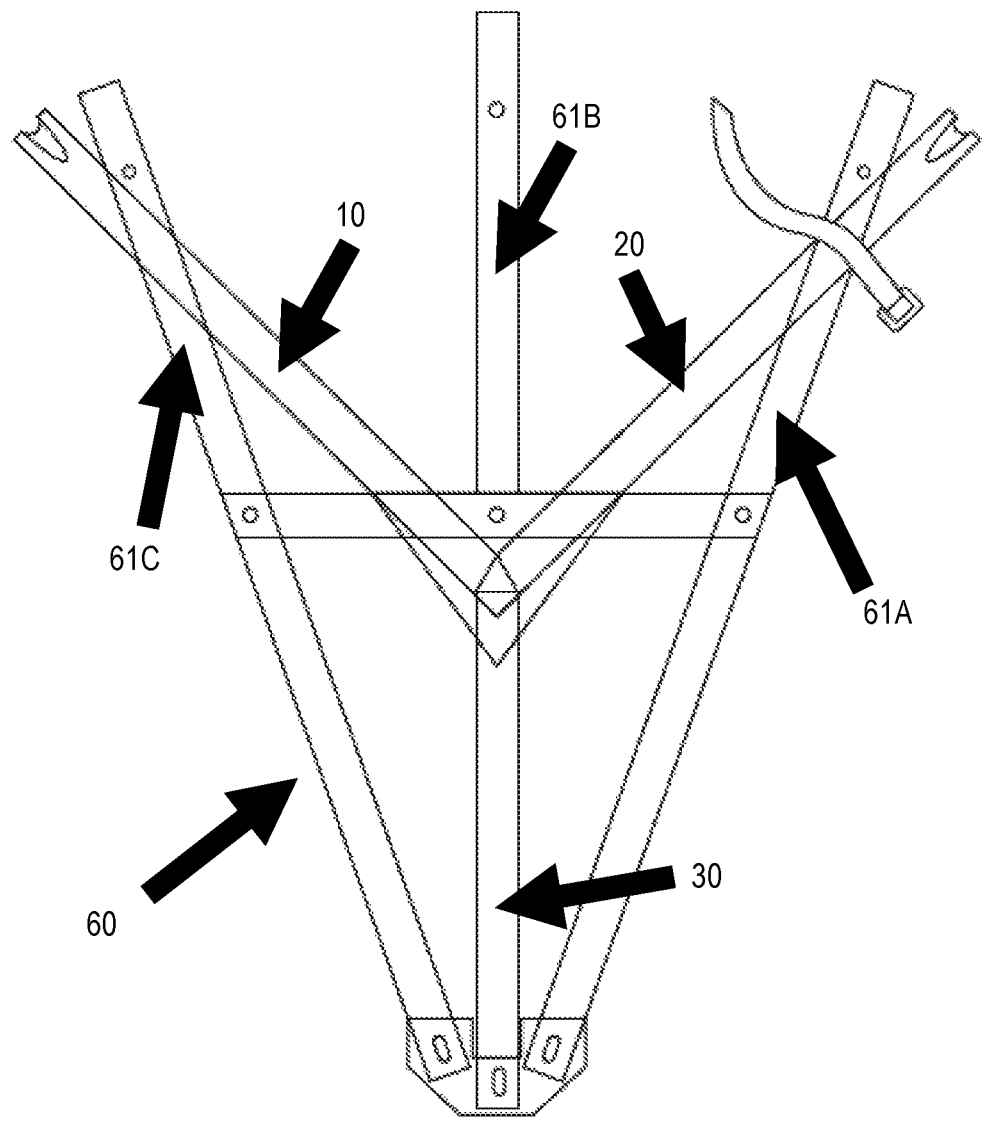
FIG. 6 illustrates a front view of an accessory receptacle member according to one example implementation of the present disclosure.

Referring to FIG. 6, in some aspects, the accessory receptacle member 60 may define a plurality of channels 61A, 61B, 61C configured to receive an accessory attachment 70 therein. For example, each of the channels 61A, 61B, 61C may be configured to reciprocally engage a respective accessory attachment 70 such as, for example, in a friction fit. In some aspects, the accessory receptacle member 60 may be configured to receive at least two and/or three accessory attachments 70, such as, for example, flag poles, in each of the accessory receptacle member channels 61A, 61B, 61C.

Figure 9:
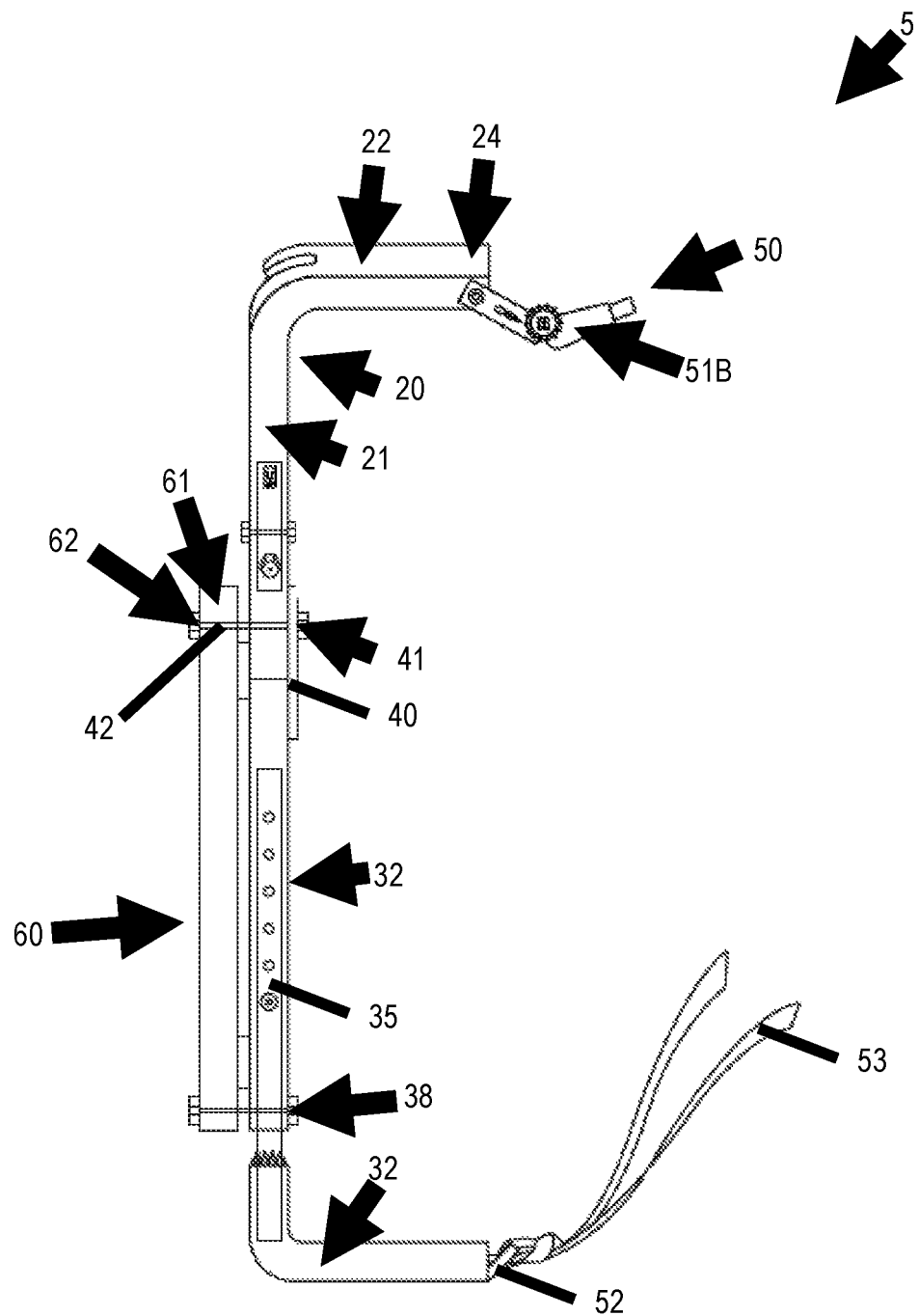
FIG. 9 illustrates a side view of an adjustable attachment apparatus according to one example implementation of the present disclosure.

According to another exemplary aspect, the accessory receptacle member 60 may extend vertically to a point disposed higher than the first portions 12, 22 of the first and second attachment arms 10, 20 respectively. In another aspect, as shown in FIG. 9, the accessory receptacle member 60 may extend vertically to a point disposed lower than the first portions 12, 22 of the first and second attachment arms 10, 20 respectively.

Figure 10:
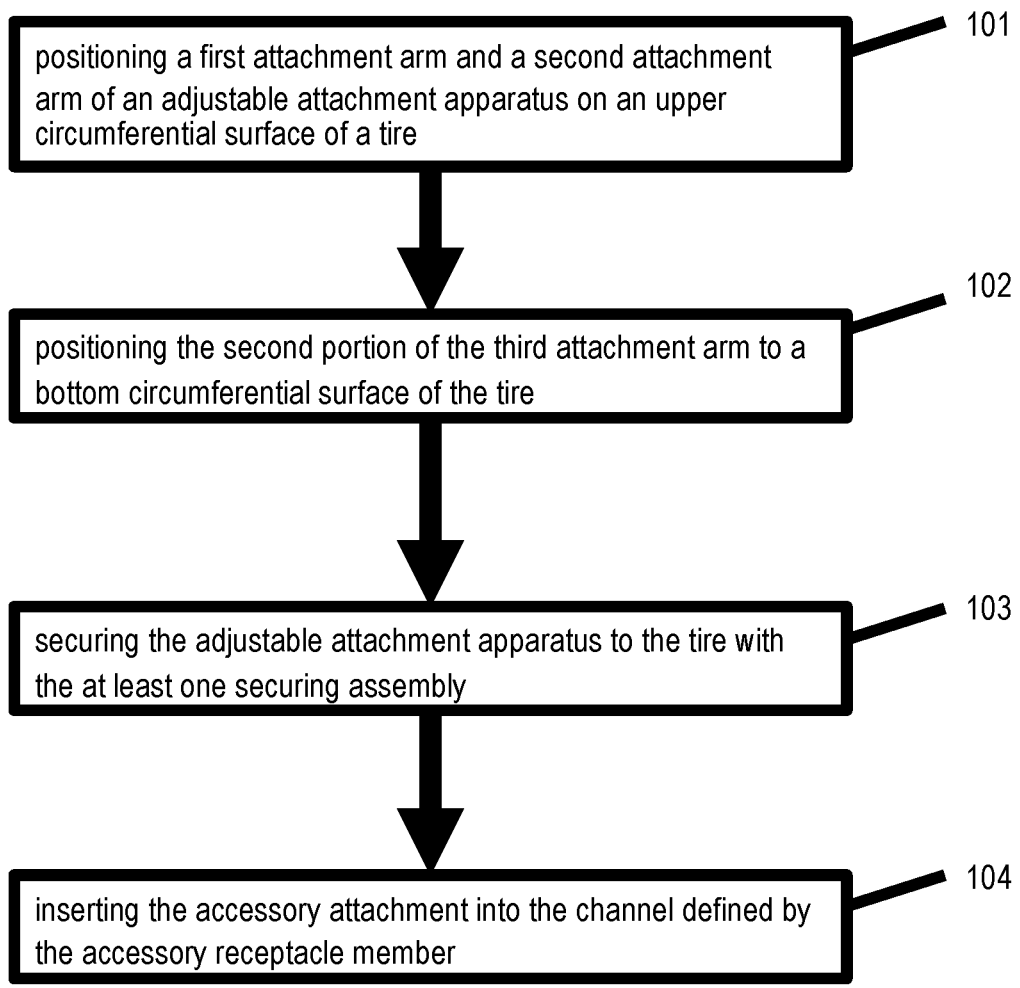
FIG. 10 illustrates a schematic block diagram of a method of attaching an apparatus to a tire.

One exemplary aspect of the present disclosure provides a method for attaching an adjustable attachment apparatus, like those previously discussed herein, to a tire. For example, FIG. 10 illustrates a schematic block diagram of a method 100 for attaching an adjustable attachment apparatus to a tire. In some example aspects, the method 100 may include positioning a first attachment arm and a second attachment arm of an adjustable attachment apparatus, such as those described herein, on an upper circumferential surface of a tire 101. According to some aspects, the apparatus may include a first attachment arm, which may have a first portion and a second portion. Additionally, the apparatus may include a second attachment arm, which may have a first portion and a second portion as well. Further, the apparatus may include a third attachment arm that has a first portion and a second portion. The first attachment arm, the second attachment arm, and the third attachment arm may be radially spaced apart from one another. In some aspects, the apparatus may include at least one securing assembly that is configured to securely engage the first attachment arm, the second attachment arm, and the third attachment arm to the tire. Additionally or alternatively, the apparatus may include an accessory receptacle member disposed proximate to the first portion of the third attachment arm. The accessory receptacle member may define at least one channel that is aligned parallel to the first portion of the third attachment arm. Further, the channel may be configured to receive an accessory attachment therein.

In some aspects, the method may further include positioning the second portion of the third attachment arm to a bottom circumferential surface of the tire 102. For example, the method may include inserting the second portion of the third attachment arm into a channel defined by the first portion of the third attachment arm. In some aspects, the method may further include securing the second portion of the third attachment arm to the first portion of the third attachment arm. For example, the method may include inserting a securing element through apertures defined by both the first portion and the second portion of the third attachment arm so as to secure the second portion in a fixed position relative to the first portion of the third attachment arm.

According to another aspect of the present disclosure, the method may further include securing the adjustable attachment apparatus to the tire with the at least one securing assembly 103. For example, the method may include engaging a securing strap with a strap securing loop disposed proximate the second end of the third attachment arm. Additionally, the method may include engaging the securing strap with each of the ratchet buckles disposed proximate each of the second ends of the first attachment arm and the second attachment arm. For example, the method may include engaging the securing strap with each of the ratchet buckles so as to secure the apparatus to the tire disposed proximate a rear door of the vehicle.

The method may further include inserting the accessory attachment into the channel defined by the accessory receptacle member 104. For example, the method may include inserting the flag pole into the accessory receptacle member disposed proximate to the first portion of the third attachment arm. Additionally or alternatively, the method may include securing the accessory attachment to the accessory receptacle member and/or any other portion of the apparatus so as to secure the accessory in an operating configuration.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An adjustable attachment apparatus for attaching an accessory to a tire, the attachment apparatus comprising:
   a first attachment arm including a first portion and a second portion;
   a second attachment arm including a first portion and a second portion;
   a third attachment arm including a first portion and a second portion, wherein the first attachment arm, the second attachment arm, and the third attachment arm are radially spaced apart from one another;

at least one securing assembly configured to securely engage the first attachment arm, the second attachment arm, and the third attachment arm to the tire; and an accessory receptacle member disposed proximate to the first portion of the third attachment arm, the accessory receptacle member defining at least one channel aligned parallel to the first portion of the third attachment arm, the channel being configured to receive an accessory attachment therein, wherein the at least one securing assembly further comprises a first ratchet buckle assembly disposed proximate the second end of the first attachment arm, a second ratchet buckle assembly disposed proximate the second end of the second attachment arm, a strap securing loop disposed proximate the second end of the third attachment arm, and a strap configured to operably engage each of the first ratchet buckle assembly, the second ratchet buckle assembly, and the strap securing loop for securing the adjustable attachment apparatus to the tire, wherein the first attachment arm defines a pair of ratchet buckle securing apertures proximate the second end of the first attachment arm, the pair of ratchet buckle securing apertures being disposed on opposing surfaces of the first attachment arm, and wherein the second attachment arm defines a pair of ratchet buckle securing apertures proximate the second end of the second attachment arm, the pair of ratchet buckle securing apertures being disposed on opposing surfaces of the second attachment arm, and wherein the first and second attachment arm each define a ratchet buckle operating recesses defined by a surface orthogonal to the opposing surfaces defining the ratchet buckle securing apertures, the ratchet buckle operating recesses configured to provide for operation of the respective ratchet buckle assemblies disposed proximate the second end of the first attachment arm and the second end of the second attachment arm.

2. The adjustable attachment apparatus of claim 1, wherein the channel defined by the accessory receptacle member is configured to reciprocally engage an accessory attachment, the accessory attachment further comprising a flag pole.

3. The adjustable attachment apparatus of claim 1, wherein the first portion and the second portion of the third attachment arm are configured to reciprocally engage one another.

4. The adjustable attachment apparatus of claim 3, wherein the second portion of the third attachment arm is configured to extend from the first portion of the third attachment arm along a line parallel to the first portion of the third attachment arm.

5. The adjustable attachment apparatus of claim 1, wherein the second portion of the first attachment arm extends orthogonally from the first portion of the first attachment arm, and the second portion of the second attachment arm extends orthogonally from the first portion of the second attachment arm.

6. The adjustable attachment apparatus of claim 1 further comprising a securing plate disposed proximate a first end of the first attachment arm, a first end of the second attachment arm, and a first end of the third attachment arm.

7. The adjustable attachment apparatus of claim 6, wherein the securing plate further defines an accessory securing plate aperture configured to receive at least one accessory securing element therethrough.

8. The adjustable attachment apparatus of claim 7, wherein the accessory receptacle member defines at least one accessory receptacle member aperture, wherein the centers of the at least one accessory receptacle member aperture, and the center of the accessory securing plate aperture are aligned with respect to one another when the adjustable attachment apparatus is disposed in a secured configuration.

9. The adjustable attachment apparatus of claim 1, wherein the accessory receptacle member defines a plurality of channels, each channel configured to receive an accessory attachment therein.

10. The adjustable attachment apparatus of claim 1, wherein the second portion of the first attachment arm and the second portion of the second attachment arm are configured to operably engage a circumferential surface of the tire.

11. A method of attaching an adjustable attachment apparatus for attaching an accessory to a tire, the method comprising:

positioning a first attachment arm and a second attachment arm of an adjustable attachment apparatus on an upper circumferential surface of a tire, the apparatus comprising:

the first attachment arm including a first portion and a second portion;

the second attachment arm including a first portion and a second portion;

a third attachment arm including a first portion and a second portion, wherein the first attachment arm, the second attachment arm, and the third attachment arm are radially spaced apart from one another;

at least one securing assembly configured to securely engage the first attachment arm, the second attachment arm, and the third attachment arm to the tire; and an accessory receptacle member disposed proximate to the first portion of the third attachment arm, the accessory receptacle member defining at least one channel aligned parallel to the first portion of the third attachment arm, the channel being configured to receive an accessory attachment therein, wherein the at least one securing assembly further comprises a first ratchet buckle assembly disposed proximate the second end of the first attachment arm, a second ratchet buckle assembly disposed proximate the second end of the second attachment arm, a strap securing loop disposed proximate the second end of the third attachment arm, and a strap configured to operably engage each of the first ratchet buckle assembly, the second ratchet buckle assembly, and the strap securing loop for securing the adjustable attachment apparatus to the tire, wherein the first attachment arm defines a pair of ratchet buckle securing apertures proximate the second end of the first attachment arm, the pair of ratchet buckle securing apertures being disposed on opposing surfaces of the first attachment arm, and wherein the second attachment arm defines a pair of ratchet buckle securing apertures proximate the second end of the second attachment arm, the pair of ratchet buckle securing apertures being disposed on opposing surfaces of the second attachment arm, and wherein the first and second attachment arm each define a ratchet buckle operating recesses defined by a surface orthogonal to the opposing surfaces defining the ratchet buckle securing apertures, the ratchet buckle operating recesses configured to provide for operation of the respective ratchet buckle assemblies disposed proximate the second end of the first attachment arm and the second end of the second attachment arm;

positioning the second portion of the third attachment arm to a bottom circumferential surface of the tire;

securing the adjustable attachment apparatus to the tire with the at least one securing assembly; and inserting the accessory attachment into the channel defined by the accessory receptacle member.

12. The method of claim 11, wherein positioning the second portion of the third attachment arm to a bottom circumferential surface of the tire further comprises inserting the second portion of the third attachment arm into a channel defined by the first portion of the third attachment arm.

13. The method of claim 12 further comprising securing the second portion of the third attachment arm to the first portion of the third attachment arm.

* * * * *